(12) United States Patent
Taugher et al.

(10) Patent No.: US 6,496,913 B1
(45) Date of Patent: Dec. 17, 2002

(54) SYSTEM AND METHOD FOR DETECTING AND CORRECTING FRAGMENTATION ON OPTICAL STORAGE MEDIA

(75) Inventors: Lawrence N Taugher, Loveland, CO (US); Andrew J Rodgers, Loveland, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/507,214

(22) Filed: Feb. 22, 2000

(51) Int. Cl.[7] .............................................. G06F 13/00
(52) U.S. Cl. ..................... 711/170; 711/171; 711/112; 707/206
(58) Field of Search ................................. 711/170, 171, 711/112; 707/206

(56) References Cited

U.S. PATENT DOCUMENTS 5,930,828 A * 7/1999 Jensen et al. ............... 711/170
6,038,636 A * 3/2000 Brown, III et al. ......... 711/170
6,205,529 B1 * 3/2001 Shagam ...................... 711/170

FOREIGN PATENT DOCUMENTS

JP    10-289063    * 10/1998

OTHER PUBLICATIONS

"Object Based Selective Defragmentation Algorithm for Magneto Optic Media," IBM Tech. Disc. Bull., vol. 36, No. 8, Aug. 1993, pp. 399–402.*

* cited by examiner

Primary Examiner—Glenn Gossage

(57) ABSTRACT

A system, computer program product and method for defragmenting a storage media, wherein the storage media has a limited number of direct overwrites. The method comprises determining an amount of fragmentation of the medium, calculating an ideal transfer time by dividing a size of selected data with a maximum data transfer rate of a device that uses the storage medium, determining a data transfer time associated with the selected data, dividing the data transfer time by the ideal transfer time to form an amount of fragmentation, and initiating defragmentation operations for the selected data when the amount of fragmentation exceeds a predetermined threshold.

24 Claims, 1 Drawing Sheet

SYSTEM AND METHOD FOR DETECTING AND CORRECTING FRAGMENTATION ON OPTICAL STORAGE MEDIA

REFERENCE TO RELATED APPLICATIONS

Reference is made to the following co-pending and commonly assigned U.S. Patent Applications: U.S. patent application Ser. No. 09/157,886 entitled SYSTEM AND METHOD FOR DATA ERROR RECOVERY, which is hereby incorporated by reference, now U.S. Pat. No. 6,401,229; U.S. patent application Ser. No. 09/245,471 (issued as U.S. Pat. No. 6,266,791) entitled SYSTEM AND METHOD FOR SELECTIVELY MOVING DATA TO ALTERNATIVE STORAGE LOCATIONS IN A STORAGE MEDIUM, which is hereby incorporated by reference; and U.S. patent application Ser. No. 09/246,337 (issued as U.S. Pat. No. 6,266,677) entitled METHOD TO AUTOMATICALLY AND PERIODICALLY ENSURE THE INTEGRITY OF DATA ON A DATA SOURCE, which is hereby incorporated by reference

TECHNICAL FIELD OF THE INVENTION

This application relates in general to optical disc storage media and in particular to a mechanism for detecting fragmentation on rewritable optical disc media.

BACKGROUND OF THE INVENTION

The files on randomly accessible data storage devices, such as hard drives and rewritable compact discs (CD-RW) become fragmented with use. As files are edited, deleted or added, portions of a file become separated from the remainder of the file. This causes or forms bole locations in the media that are not use&. This will slow down system performance because of increased seek times for the system.

Note that normal compact disc (CD) write operations accelerate fragmentation. The CD disc is large when compared to the user data stored thereon, and the CD media have direct overwrite (DOW) limitations. Thus, the CD device will stagger the placement of data onto the disc. In other words when a file is edited, the older file or portion of the file is not overwritten, but rather the edited portion is written elsewhere on the disc, typically further downstream on the disc. Typical CD write and erase operations move data in a continuous loop from the front of the disc to the back of the disc to write data evenly across the disc. This reduces the wearout of the disc, but increases fragmentation as portions of the file are scatted across the disc.

In the prior art, programs are available to defragment hard drives or hard disks. A user would install and execute a program which would examine the disk and determine how the files are scattered across it. By copying files from their current location to other portions of the disk, and then filling in holes in the disks, the program is able to compact the files to the front end of the disk. Having all the files compactly located in the front of the disk, rather than scattered throughout the whole disk, decreases access time, and thus increases performance.

However, the hard drive defragmentation programs are not optimized for optical discs, such as CD-RW or digital versatile discs (DVD) rewritable discs. Unlike hard drives, optical disc media, such as CD-RW media have very limited number of direct overwrites (DOW). CD-RW media can currently be overwritten about 1000 times before the disc wears out, whereas hard drives can be overwritten millions of times. The hard drive defragmentation programs that write and rewrite data several times to perform one defragmentation of the hard disk if applied to the CD technology would quickly wear out CD-RW discs. Also note that the file structure of a hard drive is different from that of a CD, a CD-RW, a DVD disc, or a DVD rewritable disc. Furthermore, hard drive programs concentrate the data that is stored in the hard disk to one particular location, namely towards the inner diameter of the disk. Thus, hard drive programs would wear out the inner diameter of a CD disc before the rest of the disc.

If defragmentation is not performed on a disc, then performance will be degraded. Note that access time is even more critical for CDs than for hard drives. The access time for a typical hard disk is about 5 milliseconds, which is the time required for the head to swing halfway across the disk. The typical access time on CD-RW media is on the order of 150 milliseconds. The slower the device, the greater impact fragmentation has on performance, i.e. a 10% increase in access time on a CD is more pronounced than a 10% increase for a hard disk. Thus, defragmenting the CD disc would greatly improve system performance.

Another problem is that users do not know when to run the defragmentation programs on the hard disk. Users may not even be aware of defragmentation programs. Thus, users either run the program too frequently or too infrequently. If the user runs the program too frequently on hard drives, then this will have little effect on the hard drive because of the extremely high DOW. On the other hand, if this technology is applied to CDs, then a user rig the program too frequently will quickly wear out the CD disc. If the users run the program too infrequently on hard drives, then this will have a small effect on the performance of the hard drive because of the fast access times. On the other hand, if this technology is applied to CDs, then a user running the program too infrequently will suffer a large performance degradation because of the slow access time. The prior art does not automatically inform users of when to run defragmentation programs.

Thus, the prior art hard drive defragmentation programs are insufficient for use with optical disc technology, such as CD technology. Therefore, there is a need in the art for a defragmentation program that will automatically perform defragmentation when appropriate, which balances the DOW limitations with the performance gains yielded from defragmentation.

SUMMARY OF THE INVENTION

These and other objects, features and technical advantages are achieved by a system and method which implements a defragmentation utility on an optical disc, such as a CD-RW disc, a DVD rewritable disc, or the like. Processing according to embodiments of the present invention is automatically invoked, and begins to examine the CD disc upon its insertion. This is preferably done in the background when no other user requested actions are pending. In the preferred embodiment, the examination will be interrupted if a user action is requested and then continue when the user action is complete, so the user will not experience any performance degradation. Processing according to embodiments of the present invention then determines the amount of fragmentation that the CD-RW disc has incurred through its use. This is determined by comparing an ideal data transfer time with a calculated amount of data transfer time. Transfer time depends on the amount of fragmentation (which effects access time) and the size of the file. If the amount of fragmentation exceeds a predetermined limit, then the disc is defragmented. In the preferred embodiment, the predetermined limit is a performance increase of greater than 25%, after defragmentation, for data retrieval times of greater than or equal to 10 seconds; a performance increase of greater than 10%, after defragmentation, for data retrieval times of greater than 1 second and less than 10 seconds. For data retrieval times of 1 second or less, preferably no defragmentation is performed.

The threshold limit represents a balance between CD performance and DOW requirements. During defragmentation, data from the CD disc is collected and stored on another storage medium, e.g. a hard disk. By using a storage medium separate from the CD disc for temporary storage, additional writes to the disc ate avoided. The data is then reorganized and written back to the CD disc.

Therefore, it is a technical advantage of the present invention to defragment optical discs, which improves performance of systems using optical discs.

It is another technical advantage of the present invention that the determination to defragment an optical disc, such as a CD-RW disc, balances the performance gains and DOW limitations.

It is a further technical advantage of the present invention that another storage media is used for temporary storage of data during defragmentation, which reduces the number of writes to the CD-RW disc.

It is a further technical advantage of the present invention that processing according to embodiments of the present invention operates in the background and is transparent to a user, thereby not interfering with the normal use of the CD-RW device.

It is a further technical advantage of the present invention that processing according to embodiments of the present invention automatically determines and performs defragmentation, thereby balancing performance and DOW.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
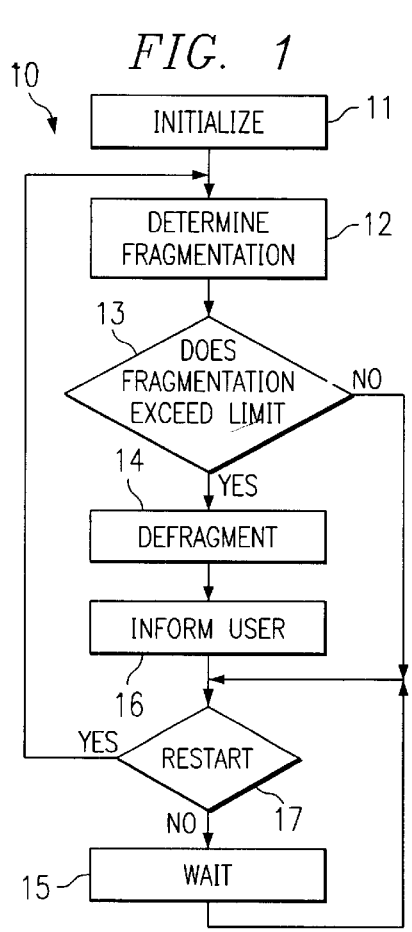
FIG. 1 depicts a flow chart of initiation of defragmentation according to embodiments of the present invention.

FIG. 1 depicts a flow chart 10 that depicts processing according to embodiments of the present invention. After a disc is inserted in an optical disc drive, such as a CD drive, and a predetermined amount of time of non use of the optical disc drive, flow chart 10 automatically begins to examine the CD-RW disc as depicted by box 11. Thus, the user does not have to invoke processing according to embodiments of the present invention and the operation of processing according to embodiments of the present invention is transparent to the user. Consequently, novice users that are unaware of defragmentation processing in general, will realize the increased performance aspects of defragmentation. Processing according to embodiments of the present invention operates in the background of computer operations, and thus processing according to embodiments of the present invention operates without the intervention or the knowledge of the user. Note that CD operations have precedence over processing according to embodiments of the present invention, and thus processing according to embodiments of the present invention will slow or halt defragmentation operations when the CD disc is being used by either the user or the computer system by entering into hold state. Processing according to embodiments of the present invention can enter the hold state from any point in the processing, and exit hold time after a predetermined amount of time of non use.

Program logic according to embodiments of the present invention can be stored on the CD-RW disc itself. A reference to the program logic is placed in the autorun file, and thus, when the CD is loaded into the computer system, the program is invoked. Alternatively, the program logic can be stored in a computer system, and would be loaded upon system start up. The program logic would then begin to check the CD discs and defragment the disc as needed as they are loaded into the system.

Flow chart 10 then determines the amount of fragmentation that the CD-RW disc has incurred, as shown by box 12. The preferred measurement is the amount of deterioration of performance of file transfers. Processing according to embodiments of the present invention would know the ideal performance of a file transfer of the CD-RW device from hardware characteristics such as access time and/or data transfer rates. Such information can be measured by the system. Thus, processing according to embodiments of the present invention can determine an ideal amount of time to read a particular block of data by dividing the block size by the maximum data transfer rate and adding seek time and rotational delay. An amount of performance degradation can be determined by comparing the calculated actual time to the calculated ideal time. For example, a block of data that should ideally take 100 milliseconds to transfer may take 300 milliseconds to transfer because the data is spread across the entire CD disc. Thus, performance has degraded to 33% for is block.

The following four items affect file transfer time: 1) Access time; 2) Rotational delay—(the head is on the right track but needs to wait for the disc to rotate the file under the head); 3) Spin-up/down of the disc (with Constant Linear Velocity (CLV) if the head is on an inner track and seeks to an outer track the disc has to slow down to match the CLV and vice versa); and 4) File size. Note that data transfer rate is fastest on the outer tracks when a Constant Angular Velocity (CAV) is used. Both CLV and CAV are now used in CD technology. Items 1, 2 and 3 imply that large files should be stored at the outer tracks because the total transfer time will be the sum of 1, 2 and 3 plus the data fate times the size of the file. On large files the sum of access time, rotational delay and spin-up/down of the disc will be small compared to data rate times the file size. Item 3 also implies that large files should be on the outer tracks because'of the higher data rate when CAV is used.

| Trigger Mechanism | Trigger Threshold | Action |
|---|---|---|
| Retrieval Time | ≦1 second | Do nothing |
| Retrieval Time | >1 sec and <10 sec and >10% reduction in retrieval time after de-fragmentation | De-fragment file |
| Retrieval Time | ≧10 seconds and >25% reduction in retrieval time after de-fragmentation | De-fragment file |
| Times file is accessed | >10/week | Move file to inner diameter of disc |
| Files size | <1 MB | Move file to inner diameter of disc |
| Files size | >1 MB | Move file to outer diameter of disc |
| Type of file | Files that are likely to change (*.doc, etc.) | Move file to outer diameter of disc |
| Type of file | Files that are not likely to change (*.exe, *.zip, graphic files, etc.) | Move file to inner diameter of disc |

The transfer time calculation can be made for the entire user data stored on the disc. Note non-user data such as a sparing table is not included in the calculation. Specifically, the size of all of user inputted data on the disc would be divided by the maximum data transfer rate, which would yield the ideal time. Processing according to embodiments of the present invention could determine the actual time of transfer by actually transferring the data off disc. The data would be transferred to a portion of memory, which is overwritten by subsequent transfers. By actually transferring data, an accurate transfer time can be calculated. However, this consumes system resources, and requires much time to complete. Alternatively, processing according to embodiments of the present invention may calculate an estimated transfer time, by reading the directory and noting the locations of the different portions of each file on the disc. Thus, an estimate for transferring each file can be determined. The total of the estimates for all files would represent a total estimated time for transferring the files from the disc. This value is not as accurate as the actual value, but is less costly in terms of system resources and time for completion.

In the preferred embodiment, flow chart 10 makes the determination 12 based upon all of the data stored on the CD disc. Thus, fragmentation of particular blocks or files will not cause processing according to embodiments of the present invention to defragment the CD disc, unless the fragmentation is severe enough and the size of the data is large enough to reduce the performance of the CD disc below a predetermined threshold, such as the thresholds shown in the above table. Alternatively, processing according to embodiments of the present invention may incorporate an algorithm which measures the fragmentation of the most used files or blocks. Thus, system performance would be improved if the most used files or blocks were defragmented For example, files or blocks that are repeatedly accessed and are fragmented such that performance is degraded below a predetermined threshold when accessing these files would cause the defragmentation of the CD disc. Another algorithm could be used that measures fragmentation based upon the most recently used files or blocks. For example, processing according to embodiments of the present invention would defragment the disc if a preselected number of previously accessed files or blocks were fragmented such that performance is degraded below a predetermined threshold.

The calculated amount of fragmentation, either actual or estimated, is compared against a predetermined threshold amount, as shown in box 13 in FIG. 1. In the preferred embodiment, the predetermined limit is a performance increase of greater than 25%, after defragmentation, for data retrieval times of greater than or equal to 10 seconds; a performance increase of greater than 10%, after defragmentation, for data retrieval times of greater than 1 second and less than 10 seconds. Thus, for retrieval times greater than or equal to 10 seconds, if there would be a greater than 25% reduction in retrieval time after defragmentation, then the CD will be defragmented by processing according to embodiments of the present invention. Similarly, for retrieval times greater than 1 second and less than 10 seconds, if there would be a greater than 10% reduction in retrieval time after defragmentation, then the CD will be defragmented by processing according to embodiments of the present invention. These thresholds represent a balance between CD performance and DOW requirements.

After ascertaining that the amount of fragmentation exceeds a predetermined limit in step 13, processing according to embodiments of the present invention will defragment the CD disc as shown in step 14. Processing according to embodiments of the present invention reads the data for each file or block, which is scattered across the CD disc, and stores the data onto a secondary storage medium, such as a hard drive. After each file or block is reorganized into a cohesive, contiguous data block in the secondary storage medium, it is written back onto the CD disc. Small files are written towards the inner diameter of the disc and large files are written towards the outer diameter of the disc. By using a storage medium separate from the CD disc for temporary storage, additional writes to the CD disc are avoided. This aspect is important because of the DOW limitations of CD media.

Figure 2:
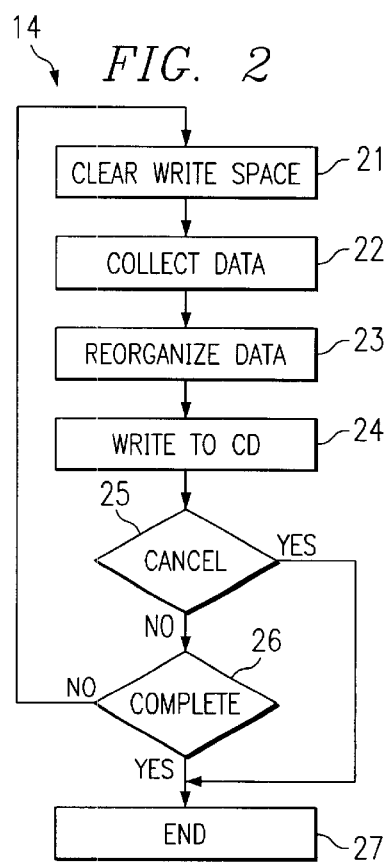
FIG. 2 depicts a flow chart of the defragmentation operation of FIG. 1.

As shown in FIG. 2, processing according to embodiments of the present invention begins defragmentation by copying a segment of data to a second storage medium such as a hard drive to clear space for the writes to the CD disc in step 21. After write space has been made, processing according to embodiments of the present invention collects the data for each file and stores the data on the hard disk drive in step 22. The data is then reorganized back into a cohesive, contiguous data file in step 23. The reorganization can be performed simultaneous with or subsequent to the data collection. The reorganized data is then written back to the CD disc in step 24. If the user (or the system) should cancel the defragmentation (deterred in step 25), processing according to embodiments of the present invention will continue to operate until the data is written back to the CD disc before ending the defragmentation as shown in step 27 or ejecting the disc. Otherwise, defragmentation will continue until the defragmentation process is completed as determined in step 26. Note that defragmentation can occur on a block by block basis, wherein each block comprises many files. However, to allow for a quick cancellation, the block should be no larger than can be transferred back to the disc without undue delay. Note that cancellation by the user does not have to involve active participation by the user, but rather could occur as a consequence from some other user activity, e.g the user writes a new file to the disc, the user signs off of the computer or ejects the CD disc.

Processing according to embodiments of the present invention may defragment only a portion of the disc. Thus, if a particular file or block of data is re-written repeatedly, and is fragmented such that performance is degraded below a predetermined threshold when accessing this data, then this file or block could be defragmented. Note that a CD can hold a large amount of data, and may have large amounts of unused space. Thus, when data for a file or block is fragmented, processing according to embodiments of the present invention will collect the data from the various locations on the disc, store it on the hard drive, and write the collection onto a new location on the CD disc, without having to move or otherwise rewrite other data on the disc. Thus, system performance can be improved without having to defragment the entire disc.

Note that other temporary storage mediums could be used, for example floppy disc or non-volatile memory, e.g. electrically erasable programmable read-only memory (EEPROM). Volatile memory such as random access memory RAM could be used if the data is not directly overwritten, i.e. the data is written back to a different portion of the disc. In such a case, lost data in RAM (because of loss of power) can be retrieved from the disc.

If desired, the user could be informed of the completion or cancellation of defragmentation in step 16 of FIG. 1. Note that this is optional, as user participation is not necessary. Also, optionally the user could be informed as to the estimated improvement in performance.

After completion or cancellation of a defragmentation operation, processing according to embodiments of the present invention determines whether to restart operations on the disc in step 17. The processing may be set to continuously monitor the fragmentation on the disc, and thus proceed directly to determining the amount of fragmentation in step 12. However, once the disc has been defragmented, the disc is not likely to become fragmented very quickly. Thus, processing according to embodiments of the present invention may utilize a dining criteria which indicates when monitoring should resume. For example, such criteria may be the number of times the disc has been accessed since defragmentation, or a length of time since defragmentation or a combination of both. When the criteria indicates that monitoring should resume, then processing according to embodiments of the present invention begins the fragmentation determination in step 12, otherwise, the processing is placed into a wait state in step 15. Other performance criteria could be used to determine when to check for fragmentation.

Although this description has discussed defragmentation with regard to a CD disc, this invention is also operative for any media that has DOW limitations and accumulates fragmentation in its use, for example DVD media in +RW, –RW, and RAM formats. Also the automated defragmentation feature makes it useful for devices with high DOW, but other defragmentation criteria could be used.

Figure 3:
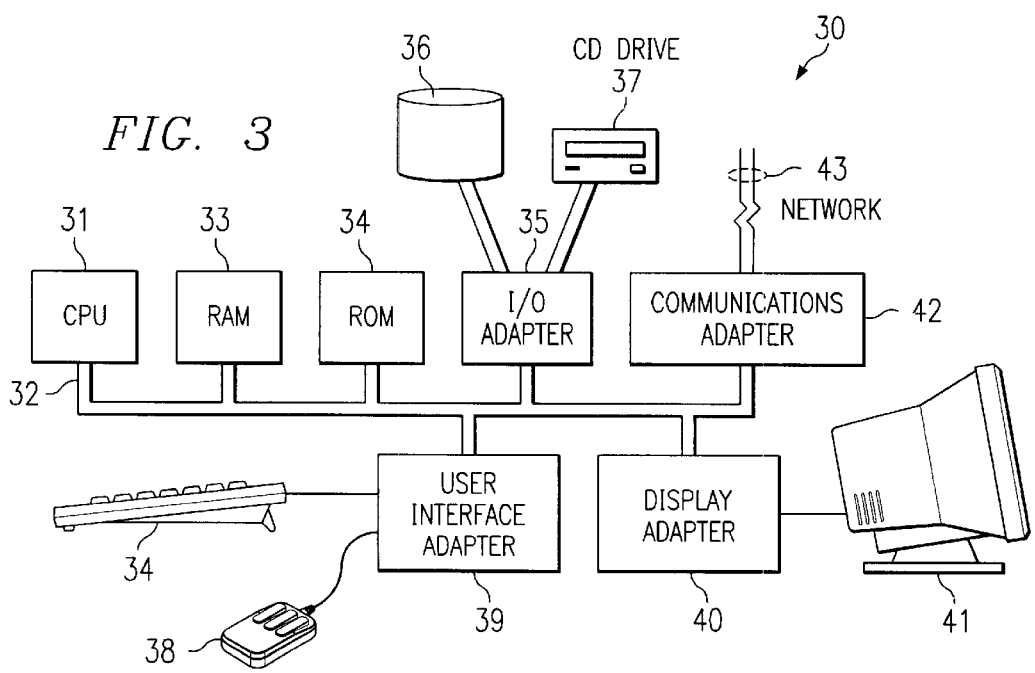
FIG. 3 depicts a high level block diagram of a computer system adapted to implement the present invention.

FIG. 3 illustrates a computer system 30 in which the present invention may be implemented. Central processing unit (CPU) 31 is coupled to bus 32. In addition, bus 32 is coupled to random access memory (RAM) 33, read only memory (ROM) 34, input/output (I/O) adapter 35, communications adapter 42, user interface adapter 39, and display adapter 40.

RAM 33 and ROM 34 hold user and system data and programs, as is well known in the ant. I/O adapter 35 connects I/O devices, such as hard drive 36 and CD drive 37, to the computer system. The adapter 35 would also connect other 110 devices, such as a local printer to the system. Communications adapter 42 is adapted to couple the computer system to a local, wide-area, or Internet network 43. User interface adapter 39 couples user input devices, such as keyboard 34 and pointing device 38, to the computer system 30. Finally, display adapter 40 is driven by CPU 31 to control the display on display device 41. Note that CPU 31 may be any general purpose CPU, such as any processor referred as a PENTIUM® processor available from the INTEL Corporation. However, the present invention is not restricted by the architecture of CPU 31 as long as CPU 31 supports the inventive operations as described herein.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for defragmenting a storage media, wherein the storage media has a limited number of direct overwrites, the method comprising:

determining an amount of fragmentation of the media;

determining whether the amount exceeds a predetermined threshold, wherein the step of determining the amount of fragmentation comprises the steps of:

calculating an ideal transfer time by dividing a size of a portion of data with a maximum data transfer rate of a device that uses the storage media;

determining a data transfer time for the portion of data;

dividing the data transfer time by the ideal transfer time to form the amount of fragmentation; and defragmenting the media if the amount exceeds the predetermined threshold.

2. The method of claim 1, wherein the storage media is an optical disc.

3. The method of claim 1, wherein said determining whether the amount of fragmentation exceeds the predetermined threshold comprises estimating whether defragmentation would result in an estimated percentage of performance improvement, and said estimated percentage is selected from the group consisting of:

25% when said ideal transfer time is greater than 9 seconds; and

10% when said ideal transfer time is greater than 1 second and less than 10 seconds.

4. The method of claim 1, wherein the determining the data transfer time comprises measuring an actual transfer time by transferring the portion.

5. The method of claim 1, wherein the determining the data transfer time comprises:

calculating an estimated transfer time by noting locations on the storage media of segments of data forming the portion.

6. The method of claim 1, further comprising:

repeating the steps of determining the amount of fragmentation and determining whether the amount exceeds a predetermined threshold, if the amount does not exceed the predetermined threshold.

7. The method of claim 1, wherein the storage media is a first storage media and the defragmenting comprises:
    collecting data from the first storage media;
    storing, temporarily, the data onto a second storage media;
    reorganizing the data into a contiguous data block of said second storage media; and
    writing the reorganized data onto the first storage media from said another storage media.

8. A computer program product having a computer readable medium having computer program logic recorded thereon for defragmenting a first storage media, wherein the first storage media has a limited number of direct overwrites, the computer program product comprising:
    means for determining an amount of fragmentation of the first storage media;
    means for determining whether the amount exceeds a predetermined threshold, wherein said means for determining comprises:
        means for calculating an ideal transfer time by dividing a size of a portion of data with a maximum data transfer rate of a device that uses the storage media;
        means for determining a data transfer time for the portion of data;
        means for dividing the data transfer time by the ideal transfer time to form the amount of fragmentation; and
    means for automatically defragmenting the first storage media if the amount exceeds the predetermined threshold;
    wherein the means for defragmenting the first storage media includes:
        means for collecting data from the first storage media;
        means for temporarily storing the data onto a second storage media; and
        means for writing the data onto the first storage media from the second storage media.

9. The computer program product of claim 8, wherein:
    the first storage media is selected from the group consisting of a CD-rewritable disc and a DVD rewritable disc; and
    the second storage media is a hard drive.

10. The computer program product of claim 8, further comprising:
    means for reorganizing the data into contiguous data on said second storage media, wherein the means for reorganizing operates prior to an operation of the means for writing.

11. The computer program product of claim 8, further comprising:
    means for clearing a write space on the first storage media by transferring a block of data to the second storage media.

12. A system for defragmenting a medium that possesses a limited number of direct over-writes, said system comprising:
    means for determining an amount of fragmentation of the medium;
    means for calculating an ideal transfer time by dividing a size of selected data with a maximum data transfer rate of a device that uses the storage medium;
    means for determining a data transfer time associated with said selected data;
    means for dividing the data transfer time by the ideal transfer time to form an amount of fragmentation; and
    means for initiating defragmentation operations for said selected data when said amount of fragmentation exceeds a predetermined threshold.

13. The system of claim 12 wherein said means for determining a data transfer time measures an actual transfer time of said selected data from said device that uses the storage medium.

14. The system of claim 12 wherein said means for determining a data transfer time estimates a transfer time by identifying locations on the storage medium where said selected data are stored.

15. The system of 12 wherein said predetermined amount depends on said ideal transfer time.

16. The system of claim 15 wherein said predetermined amount prevents said means for initiating defragmentation operations when said ideal transfer time is less than one second.

17. The system of claim 12 further comprising:
    means for defragmenting said selected data.

18. The system of claim 17 wherein said medium is an optical disc and said means for defragmenting is operable to transfer said selected data to an inner diameter of said optical disk when said selected data is a file that comprises more than one megabyte of data.

19. The system of claim 17 wherein said medium is an optical disc and said means for defragmenting is operable to transfer said selected data to an inner diameter of said optical disk when said selected data is a file that is selected from the list consisting of an executable file, a compressed data file, and a graphics file.

20. The system of claim 17 further comprsing:
    means for transferring said selected data to a second storage medium, wherein said means for defragmenting is operable to reorganize said selected data on said second storage medium.

21. The system of claim 17 wherein said means for defragmenting is operable to temporarily halt said defragmentation operations when at least one of the following operations are issued by a user application: a read operation for said medium and a write operation for said medium.

22. A method for defragmenting a storage medium, wherein the storage medium has a limited number of direct overwrites, the method comprising:
    determining an amount of fragmentation of the medium;
    calculating an ideal transfer time by dividing a size of selected data with a maximum data transfer rate of a device that uses the storage medium;
    determining a data transfer time associated with said selected data;
    dividing the data transfer time by the ideal transfer time to form an amount of fragmentation; and
    initiating defragmentation operations for said selected data when said amount of fragmentation exceeds a predetermined threshold.

23. The method of claim 22 wherein said predetermined amount depends on said ideal transfer time.

24. The method of claim 22 further comprising:
    transferring said defragmented data to an inner diameter of said medium when said selected data is a file that is selected from the list consisting of: an executable file, a compressed data file, and a graphics file.

* * * * *